US012078600B2

(12) United States Patent
Hanada et al.

(10) Patent No.: US 12,078,600 B2
(45) Date of Patent: Sep. 3, 2024

(54) REPAIR WELDING INSPECTION DEVICE AND REPAIR WELDING INSPECTION METHOD

(71) Applicant: Panasonic Intellectual Property Management Co., Ltd., Osaka (JP)

(72) Inventors: Kazuki Hanada, Osaka (JP); Takamichi Komatsu, Osaka (JP); Ryutaro Monden, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 337 days.

(21) Appl. No.: 17/562,458

(22) Filed: Dec. 27, 2021

(65) Prior Publication Data
US 2022/0120697 A1 Apr. 21, 2022

Related U.S. Application Data

(63) Continuation of application No. PCT/JP2020/023291, filed on Jun. 12, 2020.

(30) Foreign Application Priority Data

Jun. 28, 2019 (JP) ................. 2019-122451

(51) Int. Cl.
*G01N 21/95* (2006.01)
(52) U.S. Cl.
CPC ....... *G01N 21/95* (2013.01); *G01N 2201/125* (2013.01)
(58) Field of Classification Search
CPC .... G01B 11/022; G01B 11/24; G01B 5/0037; B23K 31/125; B23K 9/0956; B23K 9/173; B23K 26/21; G01N 21/95; G01N 2021/125; G01N 2021/9518

USPC .......................................................... 702/40
See application file for complete search history.

(56) References Cited

U.S. PATENT DOCUMENTS

| 8,803,024 B2 * | 8/2014 | Wang .................... B23K 31/12 |
| | | 219/137 R |
| 2015/0273604 A1 | 10/2015 | Anderson et al. |
| 2017/0277174 A1 | 9/2017 | Maeda |

FOREIGN PATENT DOCUMENTS

| CN | 106660154 | 5/2017 |
| CN | 107229252 | 10/2017 |
| CN | 108356436 | 8/2018 |
| CN | 109664008 | 4/2019 |
| JP | 2000-167666 | 6/2000 |
| JP | 2007-203322 | 8/2007 |

(Continued)

OTHER PUBLICATIONS

International Search Report issued Sep. 8, 2020 in International (PCT) Application No. PCT/JP2020/023291.

*Primary Examiner* — John H Le
(74) *Attorney, Agent, or Firm* — Wenderoth, Lind & Ponack, L.L.P.

(57) ABSTRACT

A repair welding inspection device includes a memory that stores instructions and a processor that executes the instructions. The instructions cause the processor to perform acquiring a second threshold, which is different from a first threshold which is a determination threshold for inspection of welding performed before performing repair welding, and the second threshold being a determination threshold for inspection of the repair welding, and performing inspection after the repair welding by using the second threshold.

6 Claims, 9 Drawing Sheets

(56) References Cited

FOREIGN PATENT DOCUMENTS

| | | |
|---|---|---|
| JP | 2007-289966 | 11/2007 |
| JP | 2010-253538 | 11/2010 |
| JP | 2012-037487 | 2/2012 |
| JP | 2016-075586 | 5/2016 |
| JP | 2017-148841 | 8/2017 |

* cited by examiner

FIG. 9A
FIG. 9B
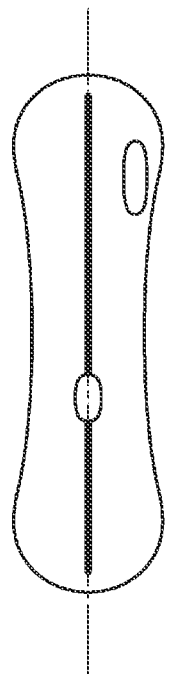
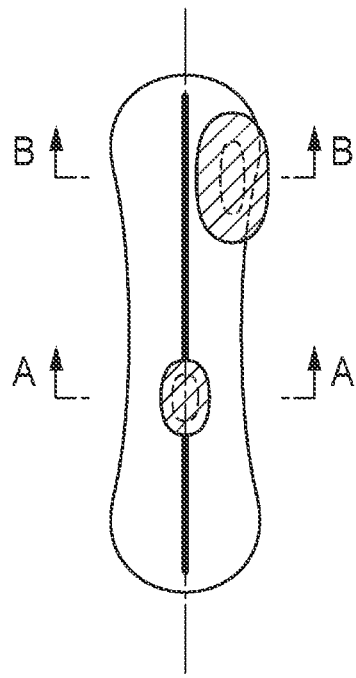
FIG. 9C
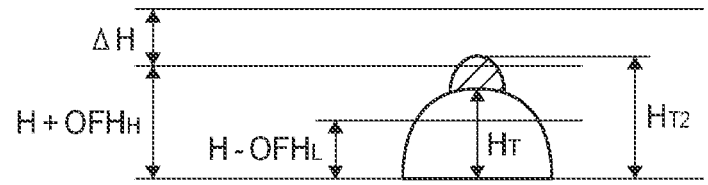
FIG. 9D
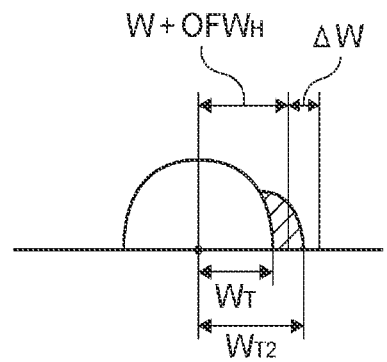

REPAIR WELDING INSPECTION DEVICE AND REPAIR WELDING INSPECTION METHOD

CROSS-REFERENCE TO RELATED APPLICATIONS

This is a continuation of International Application No. PCT/JP2020/023291 filed on Jun. 12, 2020, and claims priority from Japanese Patent Application No. 2019-122451 filed on Jun. 28, 2019, the entire content of which is incorporated herein by reference.

TECHNICAL FIELD

The present disclosure relates to a repair welding inspection device and a repair welding inspection method.

BACKGROUND ART

Patent Literature 1 discloses a shape inspection device for inspecting a shape of an inspection object using an imaging optical system, the shape inspection device includes: a projection unit configured to project slit light onto the inspection object; an imaging unit configured to image shape lines sequentially formed on the inspection object by scanning of the slit light; a point group data acquisition unit configured to acquire a three-dimensional shape of the inspection object as point group data based on imaging data of each of the sequentially formed shape lines; a cutting line setting unit configured to set a cutting line according to input to the inspection object displayed based on the point group data; and a cross-sectional shape calculation unit configured to calculate a cross-sectional shape of the inspection object at the cutting line based on the point group data corresponding to the cutting line.

SUMMARY OF INVENTION

The present disclosure provides a repair welding inspection device and a repair welding inspection method capable of performing repair welding inspection.

The present disclosure provides a repair welding inspection device including a memory that stores instructions and a processor that executes the instructions, in which the instructions cause the processor to perform acquiring a second threshold, which is different from a first threshold which is a determination threshold for inspection of welding performed before performing repair welding, and the second threshold being a determination threshold for inspection of the repair welding, and performing inspection after the repair welding by using the second threshold.

Further, the present disclosure provides a repair welding inspection method using a device including acquiring a second threshold, which is different from a first threshold which is a determination threshold for inspection of welding performed before performing repair welding, and the second threshold being a determination threshold for inspection of the repair welding; and performing inspection after the repair welding by using the second threshold.

According to the present disclosure, repair welding inspection can be performed.

BRIEF DESCRIPTION OF DRAWINGS

FIG. 4A is a cross-sectional view showing a welding bead of master data, and FIG. 4B is a cross-sectional view showing a welding bead to be inspected.

FIG. 5A is a plan view showing a welding bead of master data, and FIG. 5B is a plan view showing a welding bead to be inspected.

FIG. 6A is a plan view showing a welding bead of master data, and FIG. 4B is a plan view showing a welding bead to be inspected.

FIG. 7A is a plan view showing a state before the repair welding, FIG. 7B is a plan view showing a state after the repair welding, and FIG. 7C is a cross-sectional view taken along a line A-A showing a state after the repair welding.

FIG. 8A is a plan view showing a state before the repair welding, FIG. 8B is a plan view showing a state after the repair welding, and FIG. 8C is a cross-sectional view taken along a line A-A showing a state after the repair welding.

FIG. 9A to 9D are diagrams showing determination examples of an inspection threshold used in step St104 in a case where repair welding is performed on a defective portion whose defect type is "hole". FIG. 9A is a plan view showing a state before the repair welding, FIG. 9B is a plan view showing a state after the repair welding, FIG. 9C is a cross-sectional view taken along a line A-A showing a state after the repair welding, and FIG. 9D is a cross-sectional view taken along a line B-B showing a state after the repair welding.

DESCRIPTION OF EMBODIMENTS

Background of Present Disclosure

In the technique of JP-A-2012-037487, an appearance inspection device can determine whether a shape of a welded portion is good or bad after main welding is performed. However, in a case where the shape is not good, it is currently determined whether rewelding (repair welding) can be performed to determine whether correction can be performed, and rewelding (repair welding) for correction is performed by a welding operator who is a human. Therefore, there is a potential problem that the quality is not stable due to a skill level difference or an erroneous determination of an operator.

Further, in recent years, workpieces to be welded have been diversified. In proportion to the diversification of workpieces, the burden on a welding operator who performs repair welding is increasing.

Further, since main welding has already been performed on a workpiece to be repair-welded, inspection conditions are different each time between the main welding and the repair welding.

Therefore, the repair welding inspection device and the repair welding inspection method according to the present disclosure acquire a determination threshold for repair welding inspection, the value of which is changed (determined) according to a defect type of a welding defective portion with respect to a determination threshold for inspection of welding (main welding and the like) performed before repair welding, and determine a welded portion after the repair welding by using the determination threshold for the repair welding inspection. Accordingly, the quality of welding can be improved, and the production efficiency can be improved.

Hereinafter, embodiments specifically disclosing configurations and operations of a repair welding inspection device and a repair welding inspection method according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy of the following description and to facilitate understanding of a person skilled in the art. The attached diagrams and the following description are provided in order for a person skilled in the art to sufficiently understand the present disclosure, and are not intended to limit the matters described in the scope of the claims.

Figure 1:
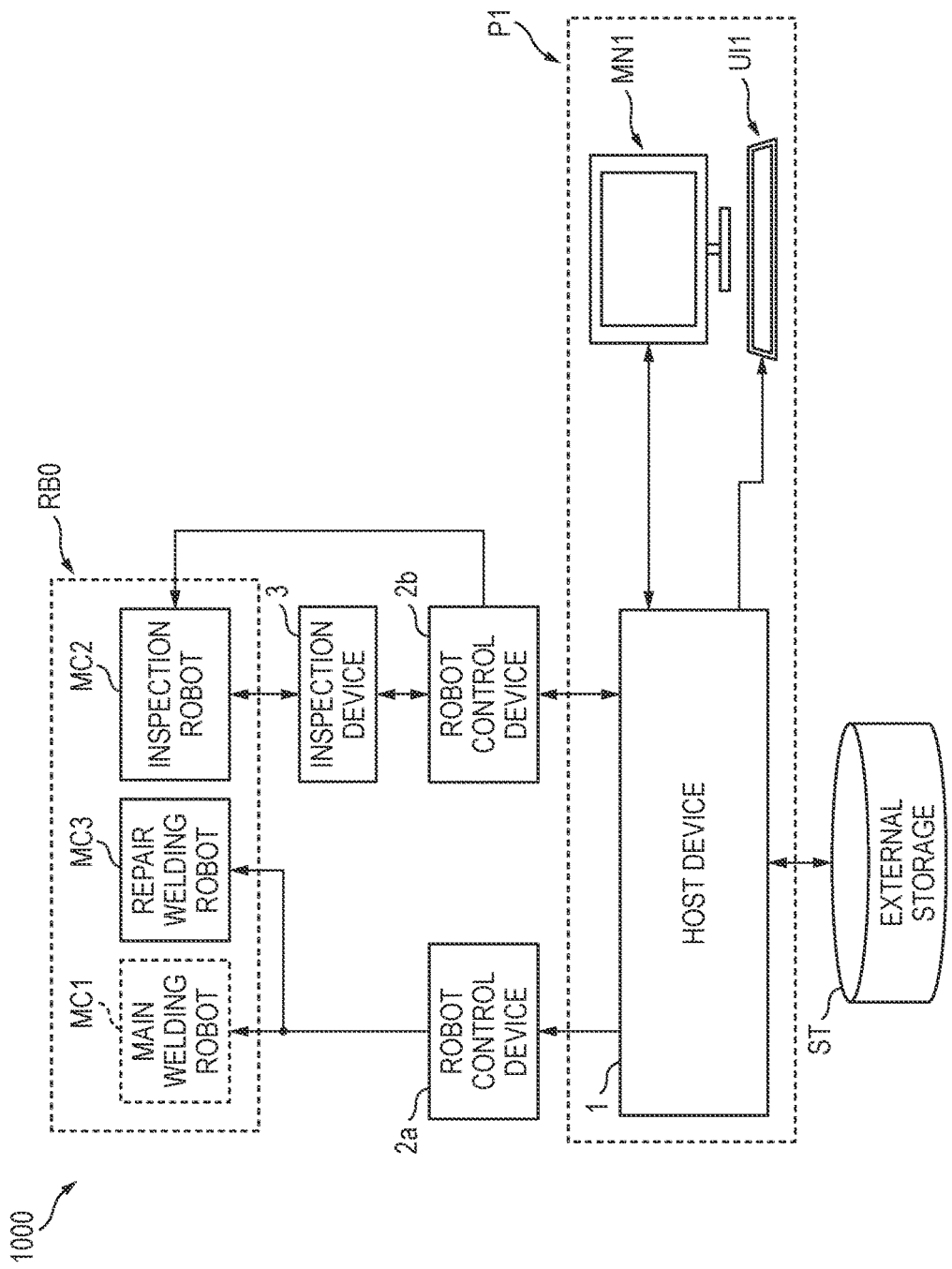
FIG. 1 is a schematic diagram showing an example of a use case of a repair welding system 1000 including a repair welding inspection device according to the present disclosure.

FIG. 1 is a schematic diagram showing an example of a use case of a repair welding system 1000 including a repair welding inspection device according to the present disclosure. The repair welding system 1000 according to the present disclosure is a system that performs, based on information input by a user or information related to welding set in advance, inspection of a welded portion actually main-welded to a workpiece Wk and correction welding (repair welding) of a defective portion determined to be defective among the welded portions. The system may perform the main welding in addition to the above-described inspection and repair welding.

The repair welding system 1000 may roughly include three devices of a robot (RB0) used for welding or inspection of a welding result, a controller that controls the robot or an inspection function of the robot, and a host device for the controller.

More specifically, the repair welding system 1000 may include a main welding robot MC1 that performs the main welding, an inspection robot MC2 that performs appearance inspection of a welded portion after the main welding, and a repair welding robot MC3 that performs repair welding when a defective portion is included in the welded portion after the main welding. Further, the welding system may include a robot control device 2a, an inspection device 3, and a robot control device 2b as controllers for controlling the above-described various robots and inspection functions of the robots. In the example of the use case, the repair welding inspection device according to the present disclosure corresponds to the inspection device 3. Further, the repair welding system 1000 may include a host device 1 for the above-described controller. The host device 1 may be connected to a monitor MN1, an interface UI1, and an external storage ST.

Although not shown, the host device 1 or various control devices included in the controller may include a communication interface (wired or wireless) that performs communication with an external network. When these devices are connected to the external network, these devices can communicate with other devices (typically, a server, a PC, various sensor devices, and the like) existing on the external network.

In FIG. 1, the main welding robot MC1 is shown as a robot different from the repair welding robot MC3. However, the main welding robot MC1 may be omitted in a case where the repair welding system 1000 executes the inspection and the repair welding after the main welding is performed using another system or the main welding is performed manually.

Further, the main welding robot MC1 may be integrated with each of the repair welding robot MC3 and the inspection robot MC2. For example, the repair welding robot MC3 may execute, by the same robot, the main welding for welding the workpiece Wk and the repair welding for correcting the defective portion among the welded portions welded by the main welding. Further, for example, the inspection robot MC2 may execute, by the same robot, the main welding for welding the workpiece Wk and the inspection for inspecting whether there is a defective portion among the welded portions welded by the main welding.

The inspection robot MC2 and the repair welding robot MC3 may be integrated into one robot, and the main welding robot MC1, the inspection robot MC2, and the repair welding robot MC3 may be integrated into one robot.

In the repair welding system 1000 shown in FIG. 1, the number of each of the main welding robots MC1, the inspection robots MC2, and the repair welding robots MC3 is not limited to the number shown in FIG. 1. For example, the number of each of the main welding robots MC1, the inspection robots MC2, and the repair welding robots MC3 may be plural or may not be the same. For example, the repair welding system 1000 may include one main welding robot MC1, three inspection robots MC2, and two repair welding robots MC3. Accordingly, the repair welding system 1000 can be adaptively configured according to a processing range, a processing speed, and the like of each robot as necessary.

The host device 1 is communicably connected to the monitor MN1, the interface UI1, the external storage ST, the robot control device 2a, and the robot controller 2b. Further, although the host device 1 shown in FIG. 1 is connected to the inspection device 3 via the robot control device 2b, the host device 1 may be directly communicably connected to the inspection device 3 without using the robot control device 2b.

The host device 1 may be a terminal device P1 integrally configured to include the monitor MN1 and the interface UI1, or may be integrally configured to further include the external storage ST. In this case, the terminal device P1 is, for example, a personal computer (PC) used by a user (operator) in executing welding. The terminal device P1 is not limited to the PC described above, and may be a computer having a communication function, such as a smartphone, a tablet terminal, and a personal digital assistant (PDA).

The host device 1 generates each of control signals for executing the main welding, the inspection of the welded portion, and the repair welding of the defective portion on the workpiece Wk based on an input operation by a user (operator) or information set in advance by the user (operator). The host device 1 transmits, to the robot control device 2a, a control signal for executing the main welding on the generated workpiece Wk and a control signal for executing the repair welding on the defective portion. Further, the host device 1 transmits, to the robot control device 2b, a control signal for executing the inspection of the welded portion welded by the main welding.

The host device 1 may collect an inspection result of the welded portion received from the inspection device 3 via the robot control device 2b. The host device 1 transmits the received inspection result to the external storage ST and the monitor MN1. Although the inspection device 3 shown in FIG. 1 is connected to the host device 1 via the robot control device 2b, the inspection device 3 may be directly communicably connected to the host device 1.

The monitor MN1 may be configured using, for example, a display such as a liquid crystal display (LCD) or an organic electroluminescence (EL). The monitor MN1 displays the inspection result and an alert of the welded portion received from the inspection device 3. The monitor MN1 may be configured using, for example, a speaker (not shown), and may notify an alert by voice when the alert is received. That is, a form for performing the notification is not limited to the notification by visual information.

The interface UI1 is a user interface (UI) that detects an input operation of a user (operator), and is configured using a mouse, a keyboard, a touch panel, and the like. The interface UI1 transmits an input operation based on the input operation of the user to the host device 1. The interface UI1 receives, for example, input of a welding line, a setting of an inspection criterion according to the welding line, an operation of starting or ending an operation of the repair welding system 1000, and the like.

The external storage ST is configured using, for example, a hard disk drive (HDD) or a solid state drive (SSD). The external storage ST may store the inspection result of the welded portion received from the host device 1.

The robot control device 2a is communicably connected to the host device 1, the main welding robot MC1, and the repair welding robot MC3. The robot control device 2a receives the control information related to the main welding received from the host device 1, controls the main welding robot MC1 based on the received control information, and causes the main welding robot MC1 to execute the main welding on the workpiece Wk.

Further, the robot control device 2a receives the control information related to the repair welding received from the host device 1, controls the repair welding robot MC3 based on the received control information, and causes the repair welding robot MC3 to execute the repair welding on the defective portion determined to be defective by the inspection device 3 among the welded portions.

The robot control device 2a shown in FIG. 1 controls each of the main welding robot MC1 and the repair welding robot MC3. However, in the repair welding system 1000 according to a first embodiment, for example, each of the main welding robot MC1 and the repair welding robot MC3 may be controlled using different control devices. Furthermore, in the repair welding system 1000 according to the first embodiment, the main welding robot MC1, the inspection robot MC2, and the repair welding robot MC3 may be controlled by a single control device.

The robot control device 2b is communicably connected to the host device 1, the inspection device 3, and the inspection robot MC2. The robot control device 2b receives information (for example, position information of a welded portion) related to the welded portion received from the host device 1. The welded portion includes a welded portion on the workpiece Wk (that is, a portion welded by the main welding) and a welded portion corrected and welded by the repair welding. The robot control device 2b controls the inspection robot MC2 based on the received information related to the welded portion, and causes the inspection robot MC2 to detect a shape of a welding bead in the welded portion. Further, the robot control device 2b transmits the received information related to the welded portion to the inspection device 3 that inspects a shape of the welded portion. The robot control device 2b transmits the inspection result received from the inspection device 3 to the host device 1.

The inspection device 3 is communicably connected to the robot control device 2b and the inspection robot MC2. The inspection device 3 inspects (determines) the presence or absence of a welding defect in the welded portion based on the information related to the welded portion received from the robot control device 2b and shape data of the welding bead of the welded portion generated by a shape detection unit 500. The inspection device 3 transmits information (for example, the information may include a defective section, position information of the defective section, and a defect factor, and the like) related to a defective portion that is determined to be defective among the welded portions to the robot control device 2b as an inspection result. When it is determined that the defective portion can be automatically repair-welded, the inspection device 3 may also transmit information such as a type of correction, a parameter for performing repair welding, and the like to the robot control device 2b as the inspection result. The inspection device 3 may be directly communicably connected to the host device 1. In this case, the inspection device 3 may be able to transmit the above-described information to the host device 1 without using the robot control device 2b.

In FIG. 1, the robot control device 2b and the inspection device 3 are described as separate bodies, but the robot control device 2b and the inspection device 3 may be integrated into a single device.

The main welding robot MC1 is a robot that is communicably connected to the robot control device 2a and executes welding (main welding) on a workpiece that has not been subjected to welding processing. The main welding robot MC1 executes the main welding on the workpiece Wk based on the control signal received from the robot control device 2a.

The inspection robot MC2 is communicably connected to the robot control device 2b and the inspection device 3. The inspection robot MC2 acquires the shape data of the welding bead of the welded portion based on the control signal received from the robot control device 2b.

The repair welding robot MC3 is communicably connected to the robot control device 2a. The repair welding robot MC3 executes the repair welding on the defective portion based on the inspection result of the welded portion (that is, information related to the defective portion) received from the robot control device 2a.

First Embodiment

Figure 2:
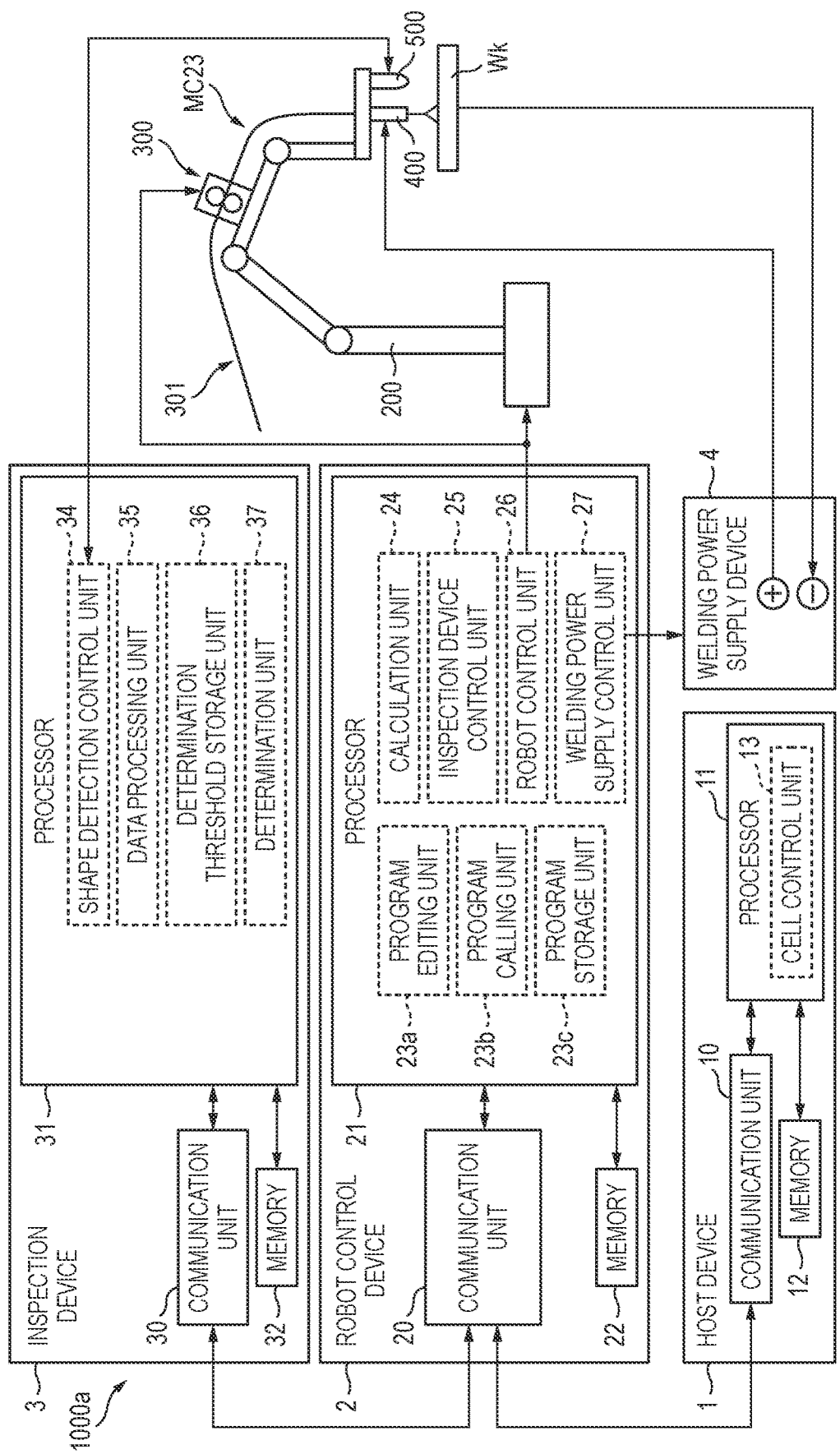
FIG. 2 is a diagram showing an internal configuration example of a repair welding system 1000a including a repair welding inspection device related to control of an inspection and repair welding robot MC23 according to a first embodiment.

FIG. 2 is a diagram showing an internal configuration example of a repair welding system 1000a including a repair welding inspection device related to control of an inspection and repair welding robot MC23 according to a first embodiment. The inspection and repair welding robot MC23 shown in FIG. 2 is a robot in which the inspection robot MC2 and the repair welding robot MC3 shown in FIG. 1 are integrated. Further, in order to make the description easy to understand, configurations related to the monitor MN1, the interface UI1, and the external storage ST are omitted.

Configuration Example of Inspection and Repair Welding Robot MC23

The inspection and repair welding robot MC23 performs, based on the control signal received from the robot control device 2, inspection of a welded portion in the workpiece Wk after the main welding is executed. Further, the inspection and repair welding robot MC23 performs repair welding on a welding defective portion in the welded portion of the workpiece Wk based on the control signal received from the robot control device 2.

In the present embodiment, the inspection and repair welding robot MC23 is a robot that performs arc welding. However, the inspection and repair welding robot MC23 may be, for example, a robot that performs laser welding and the like other than the arc welding. In this case, although not shown, instead of a welding torch 400, a laser head may be connected to a laser oscillator via an optical fiber.

In the example, the inspection and repair welding robot MC23 that performs the arc welding includes a manipulator 200, a wire feeding device 300, a welding wire 301, the welding torch 400, and the shape detection unit 500.

The manipulator 200 includes an articulated arm, and the arm moves based on a control signal received from a robot control unit 26 of the robot control device 2. As a result, positions of the welding torch 400 and the shape detection unit 500 can be controlled. An angle of the welding torch 400 with respect to the workpiece Wk can also be changed by the movement of the arm.

The wire feeding device 300 controls a feeding speed of the welding wire 301 based on the control signal received from the robot control device 2. The wire feeding device 300 may include a sensor capable of detecting a remaining amount of the welding wire 301.

The welding wire 301 is held by the welding torch 400, and when electric power is supplied to the welding torch 400 from a welding power supply device 4, an arc is generated between a tip end of the welding wire 301 and the workpiece Wk to perform the arc welding. The illustration and description of the configuration and the like for supplying shielding gas to the welding torch 400 are omitted for convenience of description.

The shape detection unit 500 included in the inspection and repair welding robot MC23 detects a shape of a welding bead in the welded portion based on the control signal received from the robot control device 2, and acquires shape data for each welding bead based on a detection result. The inspection and repair welding robot MC23 transmits the acquired shape data of the welding bead to the inspection device 3.

The shape detection unit 500 is, for example, a three-dimensional shape measurement sensor. The shape detection unit 500 includes, for example, a laser light source (not shown) configured to be able to scan the welded portion on the workpiece Wk based on position information of the welded portion received from the robot control device 2, and a camera (not shown) disposed to be able to image an imaging region including the periphery of the welded portion and configured to image a reflection trajectory (that is, a shape line of the welded portion) of the reflected laser light among the laser light emitted to the welded portion. The shape detection unit 500 transmits, to the inspection device 3, the shape data (image data) of the welded portion based on the laser light imaged by the camera.

The above-described camera (not shown) includes at least a lens (not shown) and an image sensor (not shown). The image sensor is, for example, a solid-state imaging device such as a charge-coupled device (CCD) or a complementary metal oxide semiconductor (CMOS), and converts an optical image formed on an imaging surface into an electric signal.

(Host Device)

Next, the host device 1 will be described. The host device 1 generates a control signal for executing repair welding based on an input operation by a user (operator) or information set in advance by the user (operator), and transmits the generated control signal to the robot control device 2. The host device 1 includes a communication unit 10, a processor 11, and a memory 12.

The communication unit 10 is communicably connected to the robot control device 2. The communication unit 10 transmits the control signal for executing the repair welding to the robot control device 2. The control signal for executing the repair welding referred to here may include a control signal for controlling each of the manipulator 200, the wire feeding device 300, and the welding power supply device 4.

The processor 11 is configured using, for example, a central processing unit (CPU) or a field programmable gate array (FPGA), and performs various processing and control in cooperation with the memory 12. Specifically, the processor 11 implements a function of a cell control unit 13 by referring to a program and data stored in the memory 12 and executing the program.

The cell control unit 13 generates a control signal for executing the repair welding based on an input operation by a user (operator) using the interface UI1 and information set in advance by the user (operator) and stored in the external storage ST. The control signal generated by the cell control unit 13 is transmitted to the robot control device 2 via the communication unit 10.

The memory 12 includes, for example, a random access memory (RAM) as a work memory used when each processing of the processor 11 is executed, and a read only memory (ROM) that stores a program and data defining an operation of the processor 11. Data or information generated or acquired by the processor 11 is temporarily stored in the RAM. A program that defines the operation of the processor 11 is written in the ROM.

Further, the memory 12 stores an information type related to the workpiece Wk, a workpiece serial number (S/N) given in advance for each workpiece Wk, a welding line ID given for each welded portion (welding line) set by the user, and the like.

(Robot Control Device 2)

Next, the robot control device 2 will be described. The robot control device 2 controls each of the manipulator 200, the wire feeding device 300, and the welding power supply device 4 based on the control signal received from the host device 1. The robot control device 2 includes a communication unit 20, a processor 21, and a memory 22. The processor 21 includes a program editing unit 23a, a program calling unit 23b, a program storage unit 23c, a calculation unit 24, an inspection device control unit 25, a robot control unit 26, and a welding power supply control unit 27.

The communication unit 20 is communicably connected to the host device 1. The communication unit 20 receives, from the host device 1, a control signal for executing repair welding, and appearance inspection by the inspection device 3.

The processor 21 is configured using, for example, a CPU or an FPGA, and performs various processing and control in cooperation with the memory 22. Specifically, the processor 21 refers to a program and data stored in the memory 22, and executes the program to implement the functions of the respective units. The respective units are the program editing unit 23a, the program calling unit 23b, the program storage unit 23c, the calculation unit 24, the inspection device control unit 25, the robot control unit 26, and the welding power supply control unit 27. The functions of the respective units are, for example, a function of editing and calling a repair welding program for executing repair welding stored in advance, a function of generating a control signal for controlling each of the manipulator 200, the wire feeding device 300, and the welding power supply device 4 based on the called repair welding program, and the like.

The memory 22 includes, for example, a RAM as a work memory used when each processing of the processor 21 is executed, and a ROM that stores programs and data defining the operation of the processor 21. Data or information generated or acquired by the processor 21 is temporarily stored in the RAM. A program that defines the operation of the processor 21 is written in the ROM.

The program editing unit 23a edits a program (control signal) for executing repair welding based on information (for example, a determination result by the inspection device 3 to be described later) related to a defective portion received from the inspection device 3 via the communication unit 20. The program editing unit 23a refers to a repair welding basic program for executing repair welding stored in advance in the program storage unit 23c, and edits the repair welding program according to the received position and defect factor of the defective portion, parameters (correction parameters) for the repair welding, and the like. The edited repair welding program may be stored in the program storage unit 23c, or may be stored in the RAM and the like in the memory 22.

The repair welding program may include parameters such as a current, a voltage, an offset amount, a speed, a posture, and a method for controlling the welding power supply device 4, the manipulator 200, the wire feeding device 300, the welding torch 400, the shape detection unit 500, and the like when executing the repair welding.

The program calling unit 23b calls various programs stored in the ROM included in the memory 22, the program storage unit 23c, and the like. The program calling unit 23b may call a program on the inspection and repair welding robot MC23 side. Further, the program calling unit 23b can select and call an appropriate program from a plurality of programs according to the inspection result (determination result) by the inspection device 3. That is, the program calling unit 23b can change the program according to the inspection result (determination result) by the inspection device 3.

The program storage unit 23c stores various programs used by the robot control device 2. For example, the above-described repair welding basic program, the repair welding program edited by the program editing unit 23a, and the like may be stored in the program storage unit 23c.

The calculation unit 24 is a functional block that performs various calculations. The calculation unit 24 performs, for example, based on the repair welding program, calculations and the like for controlling the manipulator 200 and the wire feeding device 300 controlled by the robot control unit 26. Further, the calculation unit 24 may calculate an offset amount necessary for the repair welding for the defective portion based on the position of the defective portion.

The inspection device control unit 25 generates a control signal for controlling the inspection device 3. The control signal is transmitted to the inspection device 3 via the communication unit 20. On the contrary, the inspection device control unit 25 receives various types of information from the inspection device 3 via the communication unit 20, and performs various processing such as editing the repair welding program based on the information (program editing unit 23a) and transmitting a notification to the host device 1.

The robot control unit 26 drives each of the manipulator 200 and the wire feeding device 300 based on the repair welding program called by the program calling unit 23b or stored in the program storage unit 23c or a calculation result from the calculation unit 24. The welding power supply control unit 27 drives the welding power supply device 4 based on the repair welding program called by the program calling unit 23b or stored in the program storage unit 23c or the calculation result from the calculation unit 24.

In a case of a configuration in which the inspection robot MC2 and the repair welding robot MC3 are separated from each other, the information related to the defective portion may be transmitted from the inspection device 3 connected to the inspection robot MC2 to the robot control device 2 connected to the repair welding robot MC3 via the host device 1. The program editing unit 23a of the robot control device 2 connected to the repair welding robot MC3 may edit a program (control signal) for executing the repair welding based on information (for example, a determination result by the inspection device 3 to be described later) related to the defective portion received from the host device 1 via the communication unit 20.

In the above configuration example, a form in which the program editing unit 23a and the program calling unit 23b are provided on the robot control device 2 side has been described. However, the program editing unit and the program calling unit may be provided on the inspection device 3 side. In this case, the inspection device 3 may call the above-described program or edit the repair welding program. A calling source of the program is not limited to the inside of the inspection device 3, and a program may be called from the robot control device 2, the inspection and repair welding robot MC23 connected to the robot control device 2, and the like. The called program is edited by the program editing unit. The edited program is transmitted from the inspection device 3 to the robot control device 2 as a repair welding program, and the robot control device 2 can perform repair welding using the repair welding program.

(Inspection Device 3)

Next, the inspection device 3 will be described. The inspection device 3 inspects (determines) the welded portion of the workpiece Wk based on the shape data of the welding bead for each welded portion acquired by the shape detection unit 500.

The inspection device 3 includes a communication unit 30, a processor 31, a memory 32, a shape detection control unit 34, a data processing unit 35, a determination threshold storage unit 36, and a determination unit 37.

The communication unit 30 is communicably connected to the robot control device 2. The communication unit 30 may be directly communicably connected to the host device 1. The communication unit 30 receives information related to the welded portion (welding line) from the host device 1 or the robot control device 2. The information related to the welded portion may include, for example, a workpiece type, the workpiece S/N, the welding line ID, and the like.

Further, the inspection device 3 transmits the inspection result of the welded portion to the host device 1 or the robot control device 2 via the communication unit 30.

The processor 31 is configured using, for example, a CPU or an FPGA, and performs various processing and control in cooperation with the memory 32. Specifically, the processor 31 refers to a program and data stored in the memory 32, and executes the program to implement the functions of the respective units. Each unit includes the shape detection control unit 34, the data processing unit 35, the determination threshold storage unit 36, and the determination unit 37. The function of each unit is, for example, a function of controlling the shape detection unit 500 based on a control signal related to inspection corresponding to the welded portion received from the robot control device 2, a function of generating image data based on the shape data of the welding bead received from the shape detection unit 500, a function of executing the inspection on the welded portion based on the generated image data, and the like.

In a case of performing machine learning, the processor 31 may include, for example, a plurality of GPUs for calculation. In this case, the processor 31 may be used in combination with the above-described CPU and the like.

The memory 32 includes, for example, a RAM as a work memory used when each processing of the processor 31 is executed, and a ROM that stores programs and data defining the operation of the processor 31. Data or information generated or acquired by the processor 31 is temporarily stored in the RAM. A program that defines the operation of the processor 31 is written in the ROM. Further, the memory 32 may include, for example, a hard disk drive (HDD) or a solid state drive (SSD).

The shape detection control unit 34 controls the shape detection unit 500 based on the shape data of the welding bead in the welded portion received from the shape detection unit 500 and the control signal related to the inspection corresponding to the welded portion received from the robot control device 2. When the shape detection unit 500 is located at a position at which the shape detection unit 500 can image the welded portion (shape detection is possible), the shape detection control unit 34 causes the laser beam to be emitted to acquire the shape data of the welding bead in the welded portion. When the shape detection control unit 34 receives the shape data acquired by the shape detection unit 500, the shape detection control unit 34 outputs the shape data to the data processing unit 35.

The data processing unit 35 converts the shape data of the welding bead in the welded portion received from the shape detection control unit 34 into image data. The shape data is, for example, point group data of a shape line including a reflection trajectory of a laser beam emitted to a surface of the welding bead. The data processing unit 35 executes statistical processing on the received shape data, and generates image data related to the shape of the welding bead in the welded portion. In order to emphasize the position and shape of the welding bead, the data processing unit 35 may perform edge emphasis correction in which a peripheral edge portion of the welding bead is emphasized.

The determination threshold storage unit 36 stores each threshold set according to the welded portion in order to execute the determination according to the welded portion. Each threshold is, for example, an allowable range (threshold) related to a positional displacement of the welded portion, a threshold related to a height of the welding bead, a threshold related to a width of the welding bead. Further, the determination threshold storage unit 36 stores, as each threshold after the repair welding, an allowable range (for example, a minimum allowable value, a maximum allowable value, and the like related to the height of the welding bead) to the extent that the quality required by a customer is satisfied.

The determination threshold storage unit 36 may store an upper limit value of the number of times of inspection for each welded portion. Accordingly, the inspection device 3 can determine that it is difficult or impossible to correct the defective portion by the repair welding when the number of times of inspection exceeds a predetermined number of times of inspection during correction for the defective portion by the repair welding, and can prevent a decrease in an operation rate of the repair welding system 1000a.

The determination unit 37 refers to the threshold stored in the determination threshold storage unit 36, and determines the welded portion based on the shape data of the welding bead in the welded portion. Details of the determination will be described later with reference to FIG. 3 and the subsequent drawings.

The determination unit 37 measures a position of the defective portion (for example, a start position and an end position of the defective portion, a position of a hole formed in the welding bead, a position of an undercut, and the like), analyzes a content of a defect, and estimates a defect factor. The determination unit 37 generates the measured position of the defective portion and the estimated defect factor as an inspection result (determination result) for the welded portion, and transmits the generated inspection result to the host device 1 via the robot control device 2.

When the determination unit 37 determines that there is no defective portion, the determination unit 37 generates an alert notifying that there is no defective portion, and transmits the generated alert to the host device 1 via the robot control device 2. The alert transmitted to the host device 1 is transmitted to and displayed on the monitor MN1.

Further, the data processing unit 35 counts the number of times of inspection for each welded portion, and when a welding inspection result is not good even if the number of times of inspection exceeds the number of times of inspection stored in the determination threshold storage unit 36, the data processing unit 35 determines that it is difficult or impossible to correct the defective portion by the repair welding. In this case, the determination unit 37 generates the alert including the position of the defective portion and the defect factor, and transmits the generated alert to the host device 1 via the robot control device 2. The alert transmitted to the host device 1 is transmitted to and displayed on the monitor MN1.

The inspection device 3 may generate an alert having contents other than those described above. The alert is also transmitted to the host device 1 via the robot control device 2. The alert transmitted to the host device 1 is transmitted to and displayed on the monitor MN1.

Figure 3:
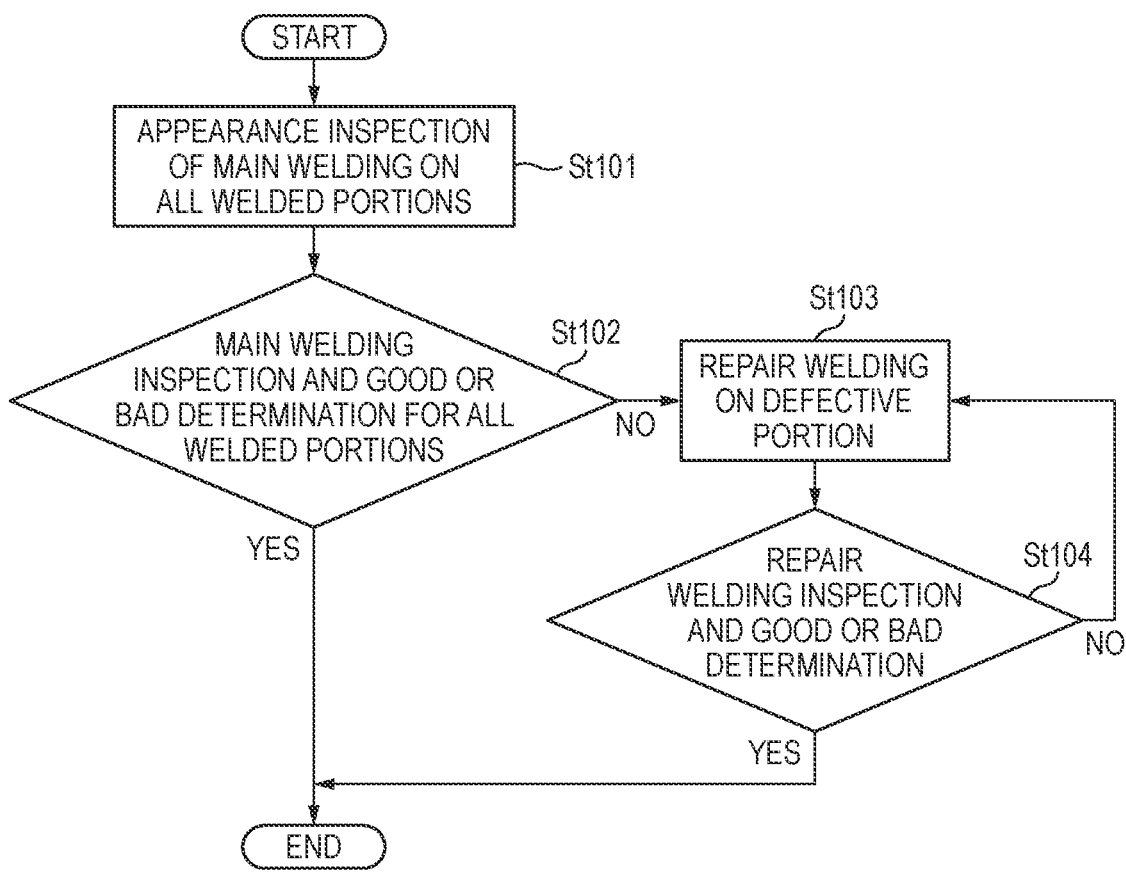
FIG. 3 is a flowchart showing an operation procedure example by the repair welding system 1000a including a repair welding inspection device according to the first embodiment.

FIG. 3 is a flowchart showing an operation procedure example by the repair welding system 1000a including a repair welding inspection device according to the first embodiment. This flowchart is based on the system configuration shown in FIG. 2, and shows an example in which the inspection and the repair welding are performed on the workpiece Wk after the main welding is performed.

First, appearance inspection is performed on the workpiece Wk after the main welding is performed (step St101). The appearance inspection is performed using the shape data acquired by the shape detection unit 500. Here, a plurality of welded portions (welding lines) may be present in one workpiece Wk. In the present embodiment, the appearance inspection is performed on all the welded portions (welding lines) of the workpiece Wk before the processing proceeds to step St102 to be described later.

Here, a state of data in the processing will be exemplified. The shape data of the welding bead detected by the shape detection unit 500 may include the plurality of welded portions (welding lines). The data processing unit 35 detects each welded portion (welding line) from the shape data. As the detection algorithm, a technique in the related art may be used. Further, the inspection device 3 may acquire a workpiece type, the serial number of the workpiece (workpiece S/N), a welding line ID, and the like in the workpiece Wk in which the welding bead is present, from the host device 1 or the robot control device 2. The inspection device 3 can manage the above-described shape data in association with the workpiece type, the workpiece S/N, the welding line ID, and the like. The inspection device 3 may store these data in the memory 32 and the like.

The memory 32 may store information indicating whether a welded portion (welding line) to be inspected has been determined to be bad in welding in the past in association with the welding line ID. When main welding inspection (step St102) and the repair welding inspection (step St104) to be described later are performed, the data processing unit 35 checks from the memory 32 whether the welded portion (welding line) to be inspected has been determined to be bad in welding in the past, and determines whether the welded portion (welding line) to be inspected is related to the main welding or the repair welding. Based on this determination, the inspection device 3 can determine whether the inspection to be performed on the welded portion (welding line) to be inspected is the main welding inspection or the repair welding inspection.

Further, the inspection device 3 can manage the shape data of the welded portion (welding line) to be inspected in association with the defect type, characteristic data, and the like. However, the data that can be associated is not limited to those described above. The inspection device 3 may store these data in the memory 32 and the like.

Next, the processor 31 performs the main welding inspection on the workpiece Wk on which the appearance inspection is performed (St102). The main welding inspection can be performed by comparing the shape data of the welding bead of the workpiece Wk to be inspected, which is detected by the shape detection unit 500, with master data stored in the memory 32 and the like. For the comparison with the master data, a threshold stored in the determination threshold storage unit 36 may be used.

A determination model is implemented in the determination unit 37 in the processor 31. For example, the determination model is a function, a method, a module, and the like for performing good or bad determination of welding. The determination unit 37 performs the determination, for example, as follows.

When the arc welding and the like is performed on a welded portion of the workpiece Wk, various shape defects may occur at the welded portion. For example, a hole or an undercut may occur in which a part of the welded portion is melted and dropped. Further, a length of the welding bead along the welding line, a position of the welding bead in a direction orthogonal to the welding line, a height of the welding bead, and the like may displace beyond the allowable range as compared with a criterion value. These "hole", "undercut", "length (displacement) of bead", "welding line displacement", "height (displacement) of bead", and the like are expressed as defect types of welding. There may be a defect type other than those described above.

The determination threshold storage unit 36 stores a threshold for the good or bad determination used by the determination unit 37. For example, for the defect type "(displacement from the criterion value) of the height of the bead", an allowable error of the height of the bead in the welded portion, in which the appearance inspection is performed, with respect to the height of the bead in the master data is the threshold. For the defect type "hole", a hole diameter (the hole diameter is 0 in the master data) in the case where the hole is present in the welded portion is the threshold.

Figure 4A:
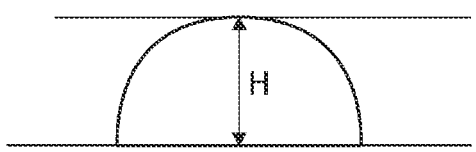
FIGS. 4A and 4B are conceptual diagrams showing a first example of a threshold for each defect type.
Figure 4B:
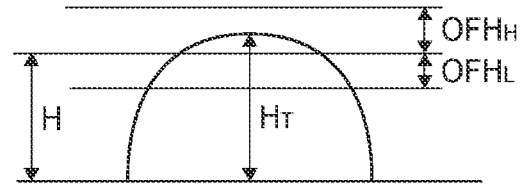

Here, FIGS. 4A and 4B will be referred to. FIGS. 4A and 4B are conceptual diagrams showing a first example of a threshold for each defect type. FIG. 4A is a cross-sectional view showing the welding bead of the master data, and FIG. 4B is a cross-sectional view showing the welding bead to be inspected. As shown in FIG. 4A, the height of the welding bead in the master data is defined as H.

When welding is actually performed, the welding is not necessarily performed at the completely same height as the height H of the welding bead in the master data. Therefore, an upper limit allowable offset value $OFH_H$ and a lower limit allowable offset value $OFH_L$ can be set as thresholds indicating a range in which an increase or decrease from the height H is allowed. It is assumed that each of the upper limit allowable offset value $OFH_H$ and the lower limit allowable offset value $OFH_L$ is a positive value.

When a height of the welding bead to be inspected is $H_T$, for example, if $H-OFH_L \leq H_T \leq H+OFH_H$, the height of the welding bead to be inspected falls within the allowable range, and (the determination unit 37 in) the processor 31 can determine that the welding is good.

On the other hand, when $H_T < H-OFH_L$ or $H+OFH_H < H_T$, the height of the welding bead to be inspected is out of the allowable range, and therefore, (the determination unit 37 in) the processor 31 can determine that the welding is bad. The defect type at this time is the "height (displacement) of bead". As described above, the determination unit 37 can use $H-OFH_L$ or $H+OFH_H$ as a determination threshold.

The thresholds (for example, the above-described thresholds $H-OFH_L$, $H+OFH_H$, and the like) used for the determination by the determination unit 37 may be generated each time the determination unit 37 uses the thresholds, and may be stored in the memory 32 and the like. The determination unit 37 may call and use the thresholds.

The thresholds that can be used by the determination unit 37 are not limited to the above values. For example, when $H_T < H \times$ allowable decrease rate or $H \times$ allowable increase rate $< H_T$ is satisfied using the allowable increase rate (1.1 and the like) and the allowable decrease rate (0.9 and the like) as thresholds, (the determination unit 37 in) the processor 31 may determine that the welding is bad. In addition, definitions of various thresholds may be used. For convenience of description, the following description will be made on the premise that $H-OFH_L$ and $H+OFH_H$ are used as the thresholds for the height of the welding bead.

Figure 5A:
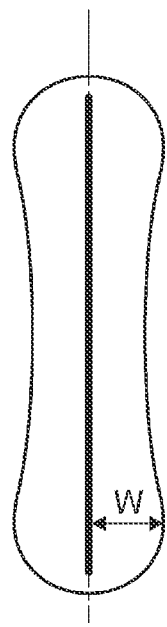
FIGS. 5A and 5B are conceptual diagrams showing a second example of a threshold for each defect type.
Figure 5B:
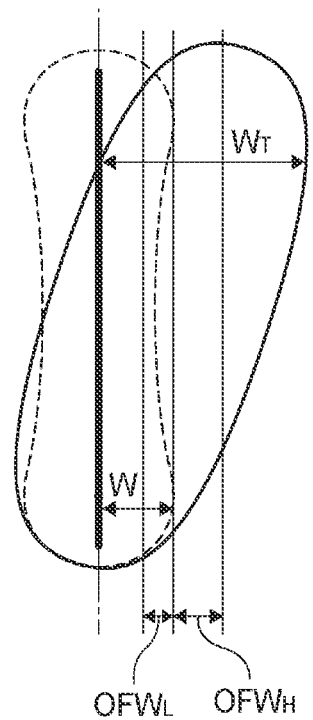
Figure 6A:
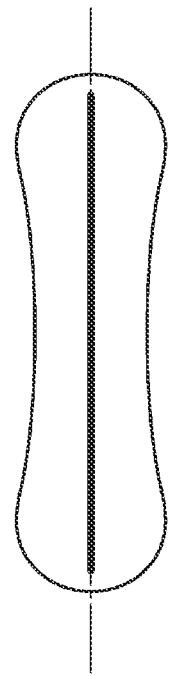
FIGS. 6A and 6B are conceptual diagrams showing a third example of a threshold for each defect type.
Figure 6B:
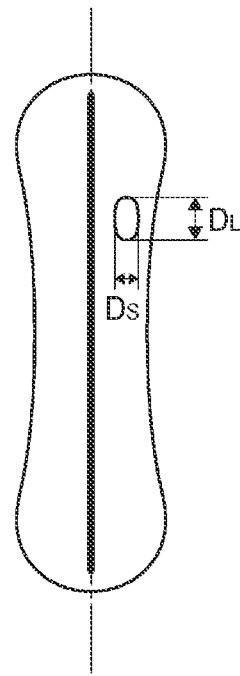

Next, FIGS. 5A and 5B will be referred to. FIGS. 5A and 5B are conceptual diagrams showing a second example of a threshold for each defect type. FIG. 5A is a plan view showing the welding bead of the master data, and FIG. 5B is a plan view showing the welding bead to be inspected. A distance (hereinafter referred to as a one-side width) from a welding line of the welding bead to an end portion of the welding bead in the master data is defined as W. Further, in FIG. 5B, the welding bead of the master data is indicated by a broken line. Thick lines in FIGS. 5A and 5b indicate welding lines. In FIGS. 6A and 6B and subsequent figures, the welding line is indicated by a thick line.

When welding is actually performed, the welding is not necessarily performed at the completely same one-side width as the one-side width W of the welding bead in the master data. Further, as indicated by a solid line in FIG. 5B, a positional displacement (including an angular displacement) with respect to the welding line may occur. Therefore, when the one-side width W of the welding bead is set as a criterion, the upper limit allowable offset value $OFW_H$ and the lower limit allowable offset value $OFW_L$ can be set as thresholds indicating a range in which the increase or decrease from the criterion is allowed. It is assumed that each of the upper limit allowable offset value $OFW_H$ and the lower limit allowable offset value $OFW_L$ is a positive value.

When a one-side width of the welding bead to be inspected is $W_T$, for example, if $W-OFW_L \leq W_T \leq W+OFW_H$, the one-side width of the welding bead to be inspected falls within the allowable range, and (the determination unit 37 in) the processor 31 can determine that the welding is good. On the other hand, when $W_T<W-OFW_L$ or $W+OFW_H<W_T$, the one-side width of the welding bead to be inspected is out of the allowable range, and therefore, (the determination unit 37 in) the processor 31 can determine that the welding is bad. The defect type at this time is the "welding line displacement". That is, the determination unit 37 can use $W-OFW_L$ or $W+OFW_H$ as the determination threshold.

The thresholds (for example, the above-described thresholds $W-OFW_L$, $W+OFW_H$, and the like) used for the determination by the determination unit 37 may be generated each time the determination unit 37 uses the thresholds, and may be stored in the memory 32 and the like. The determination unit 37 may call and use the thresholds.

The thresholds that can be used by the determination unit 37 are not limited to the above values. For example, when $W_T<W\times$allowable decrease rate or $W\times$allowable increase rate$<W_T$ is satisfied using the allowable increase rate (1.1 and the like) and the allowable decrease rate (0.9 and the like) as thresholds, (the determination unit 37 in) the processor 31 may determine that the welding is bad. In addition, definitions of various thresholds may be used. For convenience of description, the following description will be made on the premise that $W-OFW_L$ and $W+OFW_H$ are used as the thresholds for the one-side width of the welding bead.

Next, FIGS. 6A and 6B will be referred to. FIGS. 6A and 6B are conceptual diagrams showing a third example of a threshold for each defect type. FIG. 6A is a plan view showing the welding bead of the master data, and FIG. 6B is a plan view showing the welding bead to be inspected. In FIG. 6A, there is no hole in a surface of the welding bead. On the other hand, in the welding bead to be inspected shown in FIG. 6B, a hole occurs. In the present embodiment, a through hole is taken as an example, but a hole that does not penetrate may also be handled in the same manner. The handling of the hole that does not penetrate may be determined by the quality desired by the user.

The determination unit 37 may use, for example, a hole diameter D as a threshold for evaluating the hole. However, the determination unit 37 may use a threshold other than the hole diameter. The hole diameter D is defined by the following equation, where DL is a major axis of the hole and Ds is a minor axis of the hole.

$$D = (D_L + D_S)/2$$

The hole diameter in the master data is 0.

When $D_T$ is a hole diameter in a case where there is a hole in the welding bead to be inspected, for example, if $D_T<D$, (the determination unit 37 in) the processor 31 can determine that the welding is good. On the other hand, when $D \leq D_T$, since a hole having a size exceeding the allowable range occurs in the welding bead to be inspected, (the determination unit 37 in) the processor 31 can determine that the welding is bad. The defect type at this time is the "hole". As described above, the determination unit 37 can use the hole diameter D as a determination threshold.

The threshold (for example, the above-described hole diameter D and the like) used for the determination by the determination unit 37 may be generated each time the determination unit 37 uses the threshold, and may be stored in the memory 32 and the like. The determination unit 37 may call and use the threshold.

The definition of the above-described defect type and the above-described threshold is merely an example, and other defect types (for example, an undercut, bead breakage, and the like) and various thresholds according to the defect types may be used. In step St102 of FIG. 3, the determination unit 37 in the processor 31 performs determination using such a threshold, thereby inspecting the welded portion where the main welding is performed. In the present embodiment, inspection (good or bad determination) is performed on all welded portions of the workpiece Wk.

As a result of the determination by the determination unit 37 (step St102), when there is no defective portion for all the welded portions (step St102, Y), it is not necessary to perform the repair welding, and thus the processing ends. On the other hand, in a case where a defective portion of welding is present in any of the welded portions (step St102, N), the processing proceeds to step St103.

In step St103, the repair welding is performed on the welding defective portion found in the preceding step St102. The repair welding may be performed by the inspection and repair welding robot MC23. That is, under the overall control by the host device 1, the robot control device 2 may control the inspection and repair welding robot MC23 to execute the repair welding. An alert may be issued from the inspection device 3 to the welding operator, and the welding operator may perform repair welding by hand welding.

Next, the processor 31 performs repair welding inspection on the workpiece Wk on which the repair welding is performed (St104). As in step St102 described above, the repair welding inspection can be performed by comparing the shape data of the welding bead of the workpiece Wk to be inspected, which is detected by the shape detection unit 500, with the master data stored in the memory 32 and the like. A threshold is used for the comparison with the master data.

However, a threshold acquired by changing the value of the threshold used in step St102 may be used in step St104. The threshold whose value is changed will be described later.

When a determination result of the repair welding inspection is good (step St104, Y), since the defective portion is appropriately repaired by the repair welding (step St103) for the defective portion found on the workpiece Wk, the processing ends. On the other hand, when the determination result is bad (step St104, N), the repair welding is attempted again for the defective portion (step St103). An upper limit number of times of the repair welding (step St103) and the repair welding inspection (step St104) in one workpiece Wk or one welded portion is determined in advance, and when the determination of the welding inspection is not good even if the repair welding is performed the upper limit number of times, the further repair welding for the workpiece Wk may be abandoned, and the processing may be ended. In the flowchart shown in FIG. 3, the appearance inspection (step St101) is performed on all the welded portions (welding lines) included in one workpiece Wk, the welding inspection (step St102) is performed on all the welded portions (welding lines), and then the repair welding (step St103) and the repair welding inspection (step St104) are performed. However, the appearance inspection (step St101) and the main welding inspection (step St102) may be performed for each welded portion (welding line) included in one workpiece Wk, and each time a defective portion is found, the repair welding (step St103) and the repair welding inspection (step St104) may be performed for the welded portion (welding line) including the defective portion. In this case, when the inspection result is good in the welding inspection (main welding inspection or repair welding inspection) for one welded portion (welding line), the welding inspection for the next welded portion (welding line) may be performed.

Here, the step St102 and the step St104 are common in that a threshold is used for the determination unit 37 to perform the determination. However, step St104 is different from step St102 in that repair welding is further performed.

The repair welding is performed on a welded portion where the welding (main welding, previous repair welding, and the like) has already been performed. Therefore, the state of the welding bead on the workpiece Wk is different between step St102 and step St104. For example, in the welding bead at the time of step St104, the height, the one-side width, and the like of the bead increase. Therefore, in step St104, even if the threshold having the same value as that used in step St102 is used, it is not always possible to perform the good or bad determination well.

Therefore, in step St104, the good or bad determination is performed using the determination threshold for the repair welding inspection. The value of the determination threshold for the repair welding inspection may be changed from the determination threshold for the welding performed before the repair welding inspection. Hereinafter, the generation of the inspection threshold will be described.

Figure 7A:
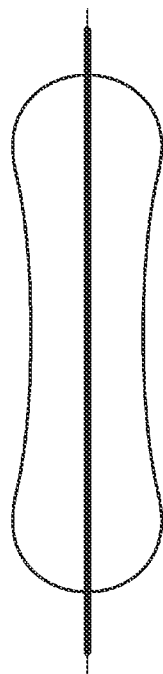
FIGS. 7A to 7C are diagrams showing determination examples of an inspection threshold used in step St104 in a case where repair welding is performed on a defective portion whose defect type is "bead breakage".
Figure 7B:
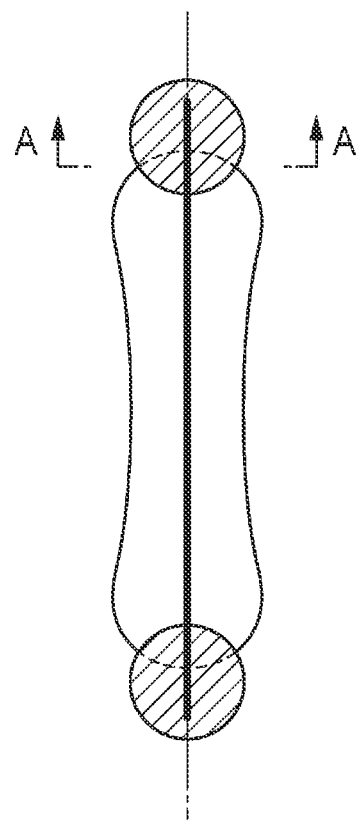
Figure 7C:
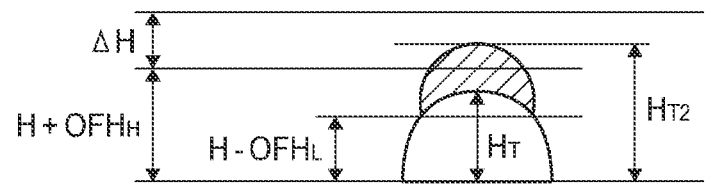

FIGS. 7A to 7C are diagrams showing determination examples of the inspection threshold used in step St104 in a case where repair welding is performed on a defective portion whose defect type is "bead breakage". FIG. 7A is a plan view showing a state before the repair welding, FIG. 7B is a plan view showing a state after the repair welding, and FIG. 7C is a cross-sectional view taken along a line A-A showing a state after the repair welding. Shaded portions in FIGS. 7B and 7C indicate welding beads added by the repair welding.

In step St102, it is assumed that a welding defect having a defect type "bead breakage" is found. It is assumed that the height $H_T$ of the bead at the time of the detection of the welding defect falls within the allowable range. That is, at the time of step St102, since $H-OFH_L \leq H_T \leq H+OFH_H$, the determination unit 37 determines that the welding is good for the defect type "height of bead".

Since a welding defect for the defect type "bead breakage" is found, the repair welding is performed in step St103. That is, the vicinity of the end portion of the welding bead is additionally welded.

In FIG. 7B shows the state after the repair welding is performed. In FIG. 7C is the cross-sectional view taken along the line A-A of in FIG. 7B. As shown in in FIG. 7B, the length of the bead is increased by the repair welding. Therefore, for the defect type "bead breakage", it is determined that the welding result is good in the repair welding inspection (step St104).

However, as shown in in FIGS. 7B and 7C, the welding bead formed by the previous welding (main welding and the like) and the welding bead newly formed by the repair welding (step St103) may have an overlapping portion (a portion of a cross section taken along the line A-A). Therefore, the overall height $H_{T2}$ of the welding bead after the repair welding is higher than the previous height $H_T$ due to the presence of the overlapping portion. That is, $H_T < H_{T2}$.

Then, when the repair welding inspection (step St104) is performed using the threshold used in the main welding inspection (step St102) as it is, as shown in FIG. 7C, for example, a magnitude relationship of the following values is acquired.

$$H - OFH_L \leq H_T \leq H + OFH_H < H_{T2}$$

That is, as a result of the repair welding, the height $H_{T2}$ of the welding bead may exceed the allowable range. In this case, in step St104, the determination result for the defect type "bead breakage" is good, but the determination result for the defect type "height of welding bead" is bad.

However, considering an actual condition of the repair welding, it is inevitable in practice that the overlapping portion of the welding bead as described above is generated to some extent by performing the repair welding. Therefore, in the repair welding inspection (step St104) after the repair welding (step St103) is performed, $H+OFH_H+\Delta H$ acquired by adding a margin value $\Delta H$ to the previous threshold $H+OFH_H$ can be set as a (new) threshold for the repair welding inspection. The processor 31 may generate the new threshold $H+OFH_H+\Delta H$ each time, or may store the new threshold $H+OFH_H+\Delta H$ in the determination threshold storage unit 36.

In step St104, the determination unit 37 performs the repair welding inspection using the (new) threshold for the repair welding inspection. That is, the height $H_{T2}$ of the welding bead after the repair welding is compared with the threshold whose value is changed. Then, a magnitude relationship of the following values is acquired.

$$H - OFH_L \leq H_T \leq H + OFH_H < H_{T2} < H + OFH_H + \Delta H$$

That is, in the repair welding inspection (step St104), the determination unit 37 can also determine that the determination result is good for the defect type "height of welding bead".

As described above, the repair welding inspection is performed using the determination threshold for the repair welding inspection, the value of which is changed (determined) according to the defect type of the welding defective portion. In the above example, since the defect type of the welding defective portion is "bead breakage", the value of the threshold for the repair welding inspection is changed from $H+OFH_H$ to $H+OFH_H+\Delta H$ according to the defect type "bead breakage", and the repair welding inspection is performed using the determination threshold in which the value is changed. Accordingly, by adjusting the determination threshold according to the defect type, it is possible to correctly perform the good or bad determination according to the actual condition of the repair welding. As a result, the quality of welding and the production efficiency can be improved.

A change amount of the threshold (the margin value $\Delta H$ in the above example) may be a fixed value or may not be a fixed value. The change amount of the threshold may be determined according to various types of information. For example, the change amount of the threshold may be determined according to welding characteristic data (a current, a voltage, a welding speed, a welding control method, a robot posture, a wire diameter, a protrusion length, and the like) of the main welding and the repair welding of the welded portion (welding line) to be inspected.

Further, the change amount of the threshold may be determined based on the information indicating the defect type, the shape data of the welding bead, setting information for the repair welding inspection, and the like. The setting information for the repair welding inspection may include information indicating required specifications of a factory or a user (for example, a maximum value of the change amount that can be recognized by the factory and the like), and the change amount of the threshold may be determined according to the requirements of the factory or the user. As an example, when there is a requirement specification that the determination criterion is not allowed to be changed between the main welding and the repair welding, the change amount ($\Delta H$) of the threshold may be determined to be 0.

Further, there are a plurality of modes in a determination method of the determination threshold used in step St104. A first determination method is to add the change amount ($\Delta H$) of the threshold to the determination threshold used in the main welding inspection (step St102).

For example, the processor 31 acquires the value of the determination threshold (H+OFH$_H$ and the like) used in the main welding inspection (step St102) from the determination threshold storage unit 36. The processor 31 can determine the determination threshold for the repair welding inspection used in step St104 by adding the change amount ($\Delta H$) of the threshold to the value.

A second determination method of the determination threshold used in step St104 is to calculate a determination threshold independently of the determination threshold used in the main welding inspection (step St102). That is, the processor 31 may acquire necessary information (the above-described information for calculating $\Delta H$, the value of H, and the value of OFH$_H$), and directly derive the determination threshold for the repair welding inspection used in step St104.

In a case where the size of the welding bead changes before and after the repair welding at the welding defective portion, for the determination threshold for limiting the change in a change direction of the size, the value may be changed so as to expand the determination criterion from the determination threshold for the inspection of the welding performed before performing the repair welding. In the above-described example, the determination threshold H+OFH$_H$ corresponds to a determination threshold whose value is to be changed. That is, the following is performed.

At the welding defective portion, the height of the welding bead changes from H$_T$ to H$_{T2}$ before and after the repair welding. Since H$_T$<H$_{T2}$, the change direction of the size is a direction in which the height increases. Since the determination threshold H+OFH$_H$ is used as an upper limit value in a height direction, the determination threshold H+OFH$_H$ limits a change in the change direction of the size, that is, a change in the direction in which the height increases. If the value of the determination threshold H+OFH$_H$ is changed to H+OFH$_H$+$\Delta H$, the determination criterion is expanded.

That is, in a case where the defect type of the welding defective portion is "bead breakage", the value of the determination threshold H+OFH$_H$ related to the height of the welding bead is changed so as to expand the determination criterion.

In the present embodiment, the inspection is performed by comparing the height H$_T$ of the welding bead with a height H of a master bead, but the inspection may be performed by comparing position coordinates of an upper end of the welding bead with respect to the workpiece with position coordinates of an upper end of the master bead with respect to the workpiece. In this case, when a difference between the position coordinates of the upper end of the welding bead with respect to the workpiece and the position coordinates of the upper end of the master bead with respect to the workpiece is within or less than OFH$_H$ during the main welding inspection, the main welding can be determined to be good, and when the difference is within or less than OFH$_H$+$\Delta H$ during the repair welding inspection, the main welding can be determined to be good. Further, the inspection device 3 may score the height of the welding bead or the position coordinates of the upper end of the welding bead described above, and provide a threshold based on the score.

Figure 8A:
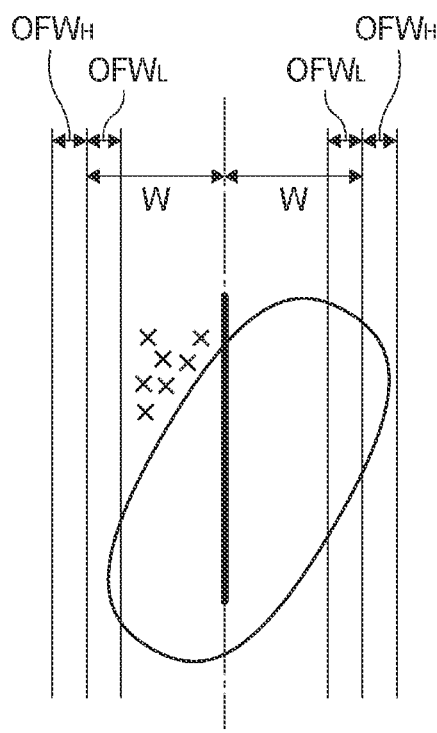
FIGS. 8A to 8C are diagrams showing determination examples of an inspection threshold used in step St104 in a case where repair welding is performed on a defective portion whose defect type is "welding line displacement".
Figure 8B:
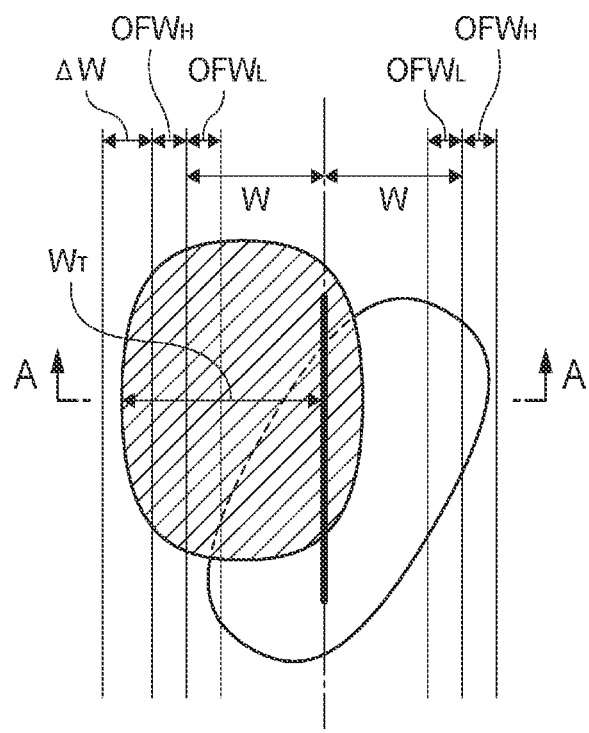
Figure 8C:
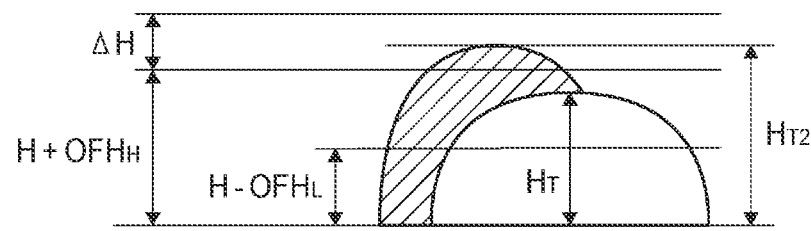

FIGS. 8A to 8C are diagrams showing determination examples of the inspection threshold used in step St104 in a case where repair welding is performed on a defective portion whose defect type is "welding line displacement". FIG. 8A is a plan view showing a state before the repair welding, FIG. 8B is a plan view showing a state after the repair welding, and FIG. 8C is a cross-sectional view taken along a line A-A showing a state after the repair welding. Shaded portions in FIGS. 8B and 8C indicate welding beads added by the repair welding.

In step St102, it is assumed that a welding defect having a defect type "welding line displacement" is found. It is assumed that the height H$_T$ of the bead at the time of the detection of the welding defect falls within the allowable range. That is, at the time of step St102, since H−OFH$_L$≤H$_T$≤H+OFH$_H$, the determination unit 37 determines that the welding is good for the defect type "height of bead".

On the other hand, the one-side width W$_T$ of the bead at the time of the detection of the welding defect does not fall within the allowable range. Since the welding bead is not formed around the welding line in a portion indicated by a mark x in in FIG. 8A, W$_T$<W−OFW$_L$ is satisfied at the time of step St102, and the determination unit 37 determines that the welding is bad for the defect type "welding line displacement". Therefore, the repair welding is performed in step St103.

In FIG. 8B shows a state after the repair welding is performed. As a result of the repair welding, a welding bead is newly formed in the portion indicated by the mark x in in FIG. 8A. In FIG. 8C shows the cross-sectional view taken along the line A-A of in FIG. 8B. Since the welding is additionally performed on a portion on the welding line where the welding bead is not formed, a strength of the welding is ensured.

However, as shown in FIGS. 8B and 8C, the welding bead formed by the previous welding (main welding and the like) and the welding bead newly formed by the repair welding (step St103) may have an overlapping portion. Therefore, the overall height H$_{T2}$ of the welding bead after the repair welding is higher than the previous height H$_T$ due to the presence of the overlapping portion. That is, H$_T$<H$_{T2}$.

Then, when the repair welding inspection (step St104) is performed using the threshold used in the main welding inspection (step St102) as it is, as shown in FIG. 8C, for example, a magnitude relationship of the following values is acquired.

$$H - OFH_L \leq H_T \leq H + OFH_H < H_{T2}$$

That is, as a result of the repair welding, the height $H_{T2}$ of the welding bead may exceed the allowable value. In this case, in step St104, the determination result for the defect type "height of welding bead" is bad.

Further, in FIG. 8B showing the state after the repair welding, the welding bead newly formed by the repair welding (step St103) exceeds an allowable value in a left side direction of in FIG. 8A. That is, since $W+OFW_H < W_T$, in step St104, the determination unit 37 determines that the welding is bad for the defect type "welding line displacement".

However, considering an actual condition of the repair welding, it is inevitable in practice that the overlapping portion of the welding bead as described above is generated to some extent by performing the repair welding. Further, in the case of repair welding for "welding line displacement", since a welding bead is additionally formed at a portion on a welding line where the welding bead is not formed, a strength of the welding is ensured, and the quality is improved.

Therefore, in the repair welding inspection (step St104) after the repair welding (step St103) is performed, $H+OFH_H+\Delta H$ acquired by adding the margin value $\Delta H$ to the previous threshold $H+OFH_H$ can be set as a (new) threshold for the repair welding inspection. Similarly, $W+OFW_H+\Delta W$ acquired by adding a margin value $\Delta W$ to a previous threshold $W+OFW_H$ can be set as a (new) threshold for the repair welding inspection. The processor 31 may generate these new thresholds $H+OFH_H+\Delta H$ and $W+OFW_H+\Delta W$ each time, or may store the new thresholds $H+OFH_H+\Delta H$ and $W+OFW_H+\Delta W$ in the determination threshold storage unit 36.

In step St104, the determination unit 37 performs the repair welding inspection using the (new) threshold for the repair welding inspection. That is, the height $H_{T2}$ of the welding bead after the repair welding is compared with the threshold whose value is changed, and the one-side width $W_T$ of the welding bead after the repair welding is compared with the threshold whose value is changed. Then, magnitude relationships of the following values are acquired.

$$H - OFH_L \leq H_T \leq H + OFH_H < H_{T2} < H + OFH_H + \Delta H$$
$$W - OFW_L < W + OFW_H < W_T < W + OFW_H + \Delta W$$

That is, in the repair welding inspection (step St104), it is possible to determine that the determination result is good for both the defect type "height of welding bead" and the defect type "welding line displacement".

As described above, the inspection device 3 performs the repair welding inspection by using the determination threshold for the repair welding inspection, the value of which is changed (determined) according to the defect type of the welding defective portion. In the above example, since the defect type of the welding defective portion is "welding line displacement", the values of the thresholds for the repair welding inspection are changed from $H+OFH_H$ to $H+OFH_H+\Delta H$ and from $W+OFW_H$ to $W+OFW_H+\Delta W$ according to the defect type "welding line displacement", and the inspection device 3 performs the repair welding inspection using the determination thresholds whose values are changed. Accordingly, by adjusting the determination threshold according to the defect type, it is possible to correctly perform the good or bad determination according to the actual condition of the repair welding. As a result, the quality of welding and the production efficiency can be improved.

The change amount of the threshold (the margin values $\Delta H$ and $\Delta W$ in the above example) may be a fixed value and may not be a fixed value, and a method of determining the change amount of the threshold and a method of determining the determination threshold used in step St104 may be the same as the example of FIGS. 7A to 7C.

Further, in a case where the size of the welding bead changes before and after the repair welding at the welding defective portion, for the determination threshold for limiting the change in a change direction of the size, the value may be changed so as to expand the determination criterion from the determination threshold for the inspection of the welding performed before performing the repair welding. In the above-described example, the determination threshold $H+OFH_H$ and the determination threshold $W+OFW_H$ correspond to determination thresholds whose values are to be changed. Since the determination threshold $H+OFH_H$ is the same as that described in FIGS. 7A to 7C, the description thereof will be omitted. The determination threshold $W+OFW_H$ is as follows.

At the welding defective portion, the one-side width of the welding bead varies before and after the repair welding. As can be seen by comparing in FIGS. 8A and 8B, the change direction of the size is a direction in which the one-side width ($W_T$ in FIG. 8B) of the welding bead increases. Since the determination threshold $W+OFW_H$ is used as an upper limit value in a one-side width direction, the determination threshold $W+OFW_H$ limits a change in the change direction of the size, that is, a change in the direction in which the one-side width increases. If the value of the determination threshold $W+OFW_H$ is changed to $W+OFW_H+\Delta W$, the determination criterion is expanded.

That is, in a case where the defect type of the welding defective portion is "welding line displacement", the values of the determination threshold $H+OFH_H$ related to the height of the welding bead and the determination threshold $W+OFW_H$ related to the one-side width of the welding bead are changed so as to expand the determination criterion.

In the present embodiment, the inspection is performed by comparing the one-side width $W_T$ of the welding bead with the one-side width W of the master bead, but the inspection may be performed by comparing position coordinates of one end of the welding bead with respect to the workpiece with position coordinates of one end of the master bead with respect to the workpiece. In this case, when a difference between the position coordinates of the one end of the welding bead with respect to the workpiece and the position coordinates of the one end of the master bead with respect to the workpiece is within or less than $OFW_H$ during the main welding inspection, the main welding can be determined to be good, and when the difference is within or less than $OFW_H+\Delta W$ during the repair welding inspection, the main welding can be determined to be good. Further, the inspection device 3 may score the one-side width of the welding bead or the position coordinates of the one end of the welding bead described above, and provide a threshold based on the score.

FIGS. 9A to 8D are diagrams showing determination examples of the inspection threshold used in step St104 in a case where repair welding is performed on a defective portion whose defect type is "hole". FIG. 9A is a plan view showing a state before the repair welding, FIG. 9B is a plan view showing a state after the repair welding, FIG. 9C is a cross-sectional view taken along a line A-A showing a state after the repair welding, and FIG. 9D is a cross-sectional view taken along a line B-B showing a state after the repair welding. Shaded portions in FIGS. 9B and 9D indicate welding beads added by the repair welding.

In step St102, it is assumed that a welding defect having a defect type "hole" is found. In the example of the drawing, two holes are found. It is assumed that the height $H_T$ of the bead at the time of the detection of the welding defect falls within the allowable range. That is, at the time of step St102, since $H - OFH_L \leq H_T \leq H + OFH_H$, the determination unit 37 determines that the welding is good for the defect type "height of bead".

On the other hand, hole diameters of two holes present in the bead at the time of the detection of the welding defect do not fall within the allowable range. The determination unit 37 determines that the welding is bad for the defect type "hole". Therefore, the repair welding is performed in step St103.

In FIG. 9B shows a state after the repair welding is performed. In FIG. 9C shows the cross-sectional view taken along the line A-A of in FIG. 9B. In FIG. 9D shows the cross-sectional view taken along the line B-B of in FIG. 9B. Since the welding is additionally performed on the two portions of holes in FIG. 9A to close the holes, it is determined that the welding is good for the defect type "hole".

However, as shown in FIG. 9C, the overall height $H_{T2}$ of the welding bead after the repair welding is higher than the previous height $H_T$ by the welding additionally performed on the portion of the hole. That is, $H_T < H_{T2}$.

Then, when the repair welding inspection (step St104) is performed using the threshold used in the main welding inspection (step St102) as it is, as shown in FIG. 9C, for example, a magnitude relationship of the following values is acquired.

$$H - OFH_L \leq H_T \leq H + OFH_H < H_{T2}$$

That is, as a result of the repair welding, the height $H_{T2}$ of the welding bead may exceed the allowable value. In this case, in step St104, the determination result for the defect type "height of welding bead" is bad.

Further, as shown in FIG. 9D, in a case where a hole is present at an end portion in a width direction of the welding bead, when the hole is closed by repair welding, the welding bead may spread to the periphery of the hole. That is, when the one-side width of the welding bead before the repair welding is $W_T$ and the one-side width of the welding bead after the repair welding is $W_{T2}$, a magnitude relationship of the following values is acquired.

$$W_T < W + OFW_H < W_{T2}$$

That is, since $W + OFW_H < W_{T2}$, in step St104, the determination result for the defect type "welding line displacement" is also bad.

However, considering an actual condition of the repair welding, it is inevitable that the height and the one-side width of the welding bead increase to some extent in association with the closing of the hole by the repair welding. Further, since the hole is closed, the quality is also improved.

Therefore, in the repair welding inspection (step St104) after the repair welding (step St103) is performed, $H + OFH_H + \Delta H$ acquired by adding the margin value $\Delta H$ to the previous threshold $H + OFH_H$ can be set as a (new) threshold for the repair welding inspection. Similarly, $W + OFW_H + \Delta W$ acquired by adding the margin value $\Delta W$ to the previous threshold $W + OFW_H$ can be set as a (new) threshold for the repair welding inspection. The processor 31 may generate these new thresholds $H + OFH_H + \Delta H$ and $W + OFW_H + \Delta W$ each time, or may store the new thresholds $H + OFH_H + \Delta H$ and $W + OFW_H + \Delta W$ in the determination threshold storage unit 36.

In step St104, the determination unit 37 performs the repair welding inspection using the (new) threshold for the repair welding inspection. That is, the height $H_{T2}$ of the welding bead after the repair welding is compared with the threshold whose value is changed, and the one-side width $W_{T2}$ of the welding bead after the repair welding is compared with the threshold whose value is changed. Then, magnitude relationships of the following values are acquired.

$$H - OFH_L \leq H_T \leq H + OFH_H < H_{T2} < H + OFH_H + \Delta H$$

$$W - OFW_L \leq W_T \leq W + OFW_H < W_{T2} < W + OFW_H + \Delta W$$

That is, in the repair welding inspection (step St104), it is possible to determine that the determination result is good for both the defect type "height of welding bead" and the defect type "welding line displacement".

As described above, the inspection device 3 performs the repair welding inspection by using the determination threshold for the repair welding inspection, the value of which is changed (determined) according to the defect type of the welding defective portion. In the above example, since the defect type of the welding defective portion is "hole", the values of the thresholds for the repair welding inspection are changed from $H + OFH_H$ to $H + OFH_H + \Delta H$ and from $W + OFW_H$ to $W + OFW_H + \Delta W$ according to the defect type "hole", and the repair welding inspection is performed using the determination thresholds whose values are changed. Accordingly, by adjusting the determination threshold according to the defect type, it is possible to correctly perform the good or bad determination according to the actual condition of the repair welding. As a result, the quality of welding and the production efficiency can be improved.

The change amount of the threshold (the margin values $\Delta H$ and $\Delta W$ in the above example) may be a fixed value and may not be a fixed value, and a method of determining the change amount of the threshold and a method of determining the determination threshold used in step St104 may be the same as the example of FIGS. 7A to 7C.

Further, in a case where the size of the welding bead changes before and after the repair welding at the welding defective portion, for the determination threshold for limiting the change in a change direction of the size, the value may be changed so as to expand the determination criterion from the determination threshold for the inspection of the welding performed before performing the repair welding. In the above-described example, the determination threshold $H+OFH_H$ and the determination threshold $W+OFW_H$ correspond to determination thresholds whose values are to be changed. Since the determination threshold $H+OFH_H$ is the same as that described in FIGS. 7A to 7C, the description thereof will be omitted. The determination threshold $W+OFW_H$ is as follows.

At the welding defective portion, the one-side width of the welding bead varies before and after the repair welding. That is, since the hole at the end portion in the width direction is closed by the repair welding, the welding bead spreads to the periphery of the hole, and as a result, the one-side width increases from $W_T$ to $W_{T2}$. The change direction of the size is a direction in which the one-side width increases. Since the determination threshold $W+OFW_H$ is used as the upper limit value in the one-side width direction, the determination threshold $W+OFW_H$ limits a change in the change direction of the size, that is, a change in the direction in which the one-side width increases. If the value of the determination threshold $W+OFW_H$ is changed to $W+OFW_H+\Delta W$, the determination criterion is expanded.

That is, in a case where the defect type of the welding defective portion is "hole", the values of the determination threshold $H+OFH_H$ related to the height of the welding bead and the determination threshold $W+OFW_H$ related to the one-side width of the welding bead are changed so as to expand the determination criterion.

For each defect type (undercut, crack, pit, and the like) other than those illustrated above, the value of the determination threshold used in step St104 may be changed according to the actual condition of the repair welding for the defect type.

As described above, a second threshold, which is the determination threshold for the inspection of the repair welding, is determined according to the defect type of the welding defective portion. Accordingly, the second threshold, which is the determination threshold for the inspection of the repair welding, can be appropriately adjusted according to various defect types.

Further, a processor acquires at least one second threshold whose value is changed so as to expand a determination criterion from a first threshold, and when a size of a welding bead changes before and after the repair welding at a welding defective portion, the second threshold being a determination threshold for limiting a change in a change direction of the size. Accordingly, the good or bad determination can be correctly performed according to the actual condition of the repair welding. As a result, the quality of welding and the production efficiency can be improved.

Further, the processor acquires a determination threshold for repair welding inspection by acquiring the first threshold and adding a value indicating a change amount of the threshold. Accordingly, the determination threshold for the repair welding can be adjusted in accordance with a condition of main welding based on a determination threshold for welding (main welding and the like) performed before performing the repair welding.

Further, the processor acquires the second threshold calculated independently of the determination threshold for the inspection of the welding performed before performing the repair welding. Accordingly, it is possible to flexibly adjust the determination threshold for the repair welding in consideration of conditions that have not been found in the main welding.

Although the various embodiments are described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Further, components in the various embodiments described above may be combined optionally in the range without deviating from the spirit of the invention.

The present disclosure is useful as a repair welding inspection device and a repair welding inspection method capable of performing repair welding inspection.

What is claimed is:

1. A repair welding inspection device, comprising:
a memory that stores instructions; and
a processor that executes the instructions,
wherein the instructions cause the processor to perform:
performing main welding inspection of a welded portion of a workpiece after main welding on the workpiece;
generating and issuing a control signal to a welding robot to perform repair welding on the workpiece when the main welding inspection detects a defect based on a first threshold of a parameter of the welded portion, which is a determination threshold for the main welding inspection of the welded portion of the workpiece;
acquiring a second threshold of the parameter of the welded portion, which is different from the first threshold of the parameter of the welded portion, the second threshold being a determination threshold for repair welding inspection of the repair welding; and
performing the repair welding inspection after the repair welding by using the second threshold.

2. The repair welding inspection device according to claim 1, wherein
the second threshold is determined based on a defect type of a welding defective portion of the welded portion.

3. The repair welding inspection device according to claim 1, wherein:
the acquiring of the second threshold comprises acquiring at least one second threshold whose value is changed so as to expand a determination criterion from the first threshold in a case that a size of a welding bead changes before and after the repair welding at a welding defective portion of the welded portion, the second threshold being a determination threshold for limiting a change in a change direction of the size.

4. The repair welding inspection device according to claim 1, wherein:
the acquiring of the second threshold comprises acquiring the second threshold by acquiring the first threshold and adding a value indicating a change amount of a threshold to the first threshold.

5. The repair welding inspection device according to claim 1, wherein;
the acquiring of the second threshold comprises acquiring the second threshold calculated independently of the determination threshold for the main welding inspection of the welded portion-welding performed before performing the repair welding.

6. A repair welding inspection method using a device including a processor, the repair welding inspection method comprising:
performing main welding inspection of a welded portion of a workpiece after main welding on the workpiece;

generating and issuing a control signal to a welding robot to perform repair welding on the workpiece when the main welding inspection detects a defect based on a first threshold of a parameter of the welded portion, which is a determination threshold for the main welding inspection of the welded portion of the workpiece;

acquiring a second threshold of the parameter of the welded portion, which is different from the first threshold of the parameter of the welded portion, the and the second threshold being a determination threshold for repair welding inspection of the repair welding; and performing the repair welding inspection after the repair welding by using the second threshold.

* * * * *